US007650677B1

(12) United States Patent
Burgess

(10) Patent No.: US 7,650,677 B1
(45) Date of Patent: Jan. 26, 2010

(54) TOOL APPARATUS AND METHOD FOR EFFICIENT ATTACHMENT OF HARDWARE COMPONENTS

(75) Inventor: Rodney Burgess, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 675 days.

(21) Appl. No.: 11/141,826

(22) Filed: Jun. 1, 2005

(51) Int. Cl.
*B23P 19/04* (2006.01)

(52) U.S. Cl. ............................. 29/267; 29/270; 29/242; 29/243; 29/280; 269/3; 269/6

(58) Field of Classification Search ................... 29/267, 29/270, 278, 242, 243, 280; 269/3, 6; 81/436, 81/28, 439, 125, 44; 254/18, 25
See application file for complete search history.

(56) References Cited

U.S. PATENT DOCUMENTS

| | | | | | |
|---|---|---|---|---|---|
| 5,253,406 | A | * | 10/1993 | Shere et al. | 29/240 |
| 5,495,651 | A | * | 3/1996 | Tsuha | 29/235 |
| 5,577,426 | A | * | 11/1996 | Eggert et al. | 81/439 |
| 5,603,248 | A | * | 2/1997 | Eggert et al. | 81/438 |
| 6,092,271 | A | * | 7/2000 | Stojkovic et al. | 29/281.5 |
| 6,409,152 | B1 | * | 6/2002 | Bagley | 254/18 |
| 6,808,182 | B2 | * | 10/2004 | Lin | 279/74 |
| 6,886,229 | B1 | * | 5/2005 | Wilson | 29/267 |
| RE38,778 | E | * | 8/2005 | Eggert et al. | 81/439 |

* cited by examiner

*Primary Examiner*—Lee D Wilson
(74) *Attorney, Agent, or Firm*—Brooks Kushman P.C.

(57) ABSTRACT

A tool and method is provided for installing nut-clips or like components, wherein safety and ease of installation are significantly improved over the prior art, and installation time is substantially reduced. A useful embodiment is directed to apparatus for use in attaching a nut-clip or other hardware component to structure having a slot defined by spaced apart edges, wherein the nut-clip has first and second resilient spaced apart hook flanges. The apparatus includes a holder adapted to receive the nut-clip, and a blade member positioned to bear against the first flange member when the nut-clip is received into the holder. A magnet or other element is provided for releasably retaining the nut-clip in the holder. A handle, which can be grasped by the single hand of a user, is attached for maneuvering the holder and retained nut-clip to position the second flange against one of the slot edges, and to thereafter apply force, through the blade member, to reduce the spacing between the first and second flanges. The two hook flanges can then be inserted into the slot, to firmly attach the nut-clip to the structure.

6 Claims, 3 Drawing Sheets

TOOL APPARATUS AND METHOD FOR EFFICIENT ATTACHMENT OF HARDWARE COMPONENTS

BACKGROUND OF THE INVENTION

1. Technical Field

The invention disclosed and claimed herein generally pertains to a tool apparatus and method for quickly and efficiently attaching hardware components to a structure. More particularly, the invention pertains to apparatus of the above type wherein the structure comprises support members provided with rectangular slots, and hardware components are provided with pairs of spaced apart flanges for insertion into respective slots. Even more particularly, the invention pertains to apparatus of the above type wherein the hardware components comprise nut-clips provided with resilient hook flanges, the nut-clips being usefully employed to attach shelves, system components or the like to the support members.

2. Description of Related Art

Hardware parts or components known as nut-clips are used to mount electronic or other components within a system cabinet or rack. Nut-clips are also referred to as speed grip nuts and retainer nut clips. Generally, a nut-clip is a nut that is sized to mate with a bolt of specified size, wherein two resilient hook flanges are attached to opposing sides of the nut. In a typical arrangement, nut-clips are used with vertical support members that are perforated with rectangular slots, at varying levels. The hook flanges are formed of resilient material. Accordingly, a force can be applied to urge the flanges together, so that they can both be inserted into a selected slot. After insertion, the force is removed, and the hook flanges move apart, to firmly affix the nut-clip to the support member.

The conventional approach for installing nut-clips requires the installer to hold the part in one hand and a screwdriver in the other hand. The part is inserted into the cabinet by placing one tab, or flange, of the nut-clip through the slot or cut-out in the cabinet, and then compressing the other flange with the screwdriver, while forcing it into the cut-out. Routinely, the clips fly out of the installer's hands and fall into the system. Frequently, the screwdriver slips off the nut-clip, damages the cabinet and, on occasion, has injured the installer.

Because of the benefits they provide, the use of nut-clips in product manufacture continues to increase. For example, a major manufacturer of data storage systems presently uses on the order of 50 nut-clip pieces in each unit of certain products. However, the level of difficulty encountered in installing nut-clips (or speed grip nuts) into a structure such as a 19-inch cabinet/rack, using conventional procedures as described above, has negatively impacted upon production time, product quality and personal safety. Clearly, it would be of great benefit to provide a means or method for installing nut-clips that was substantially faster and safer than the currently used approach.

SUMMARY OF THE INVENTION

The invention generally provides a tool and method for installing nut-clips or like components, wherein safety and ease of installation are significantly improved over the prior art, and installation time is substantially reduced. The tool eliminates the requirement for an installer to hold the nut-clip in his hand while trying to compress it with a screwdriver, thus eliminating at least some of the previous safety hazards. In addition, the tool may be readily attached to a conventional interchangeable bit driver such as is typically found in production areas. One useful embodiment of the invention is directed to apparatus for use in attaching a hardware component to structure having a slot defined by spaced apart edges, wherein the hardware component has first and second resilient spaced apart flange members. The apparatus comprises a component holder adapted to receive the hardware component, and further comprises a blade member positioned to bear against the first flange member when the hardware component is received into the holder. A retaining element is provided for releasably retaining the hardware component in the holder. The retaining element could comprise, for example, a magnet or machined tabs used to hold the hardware component in place. A handle or other manipulator is provided for maneuvering the holder and retained hardware component, to position the second flange member against one of the slot edges, and to thereafter apply force through the blade member to reduce the spacing between the first and second flange members. The two flange members can then be inserted into the slot.

DETAILED DESCRIPTION OF THE PREFERRED EMBODIMENT

Figure 1:
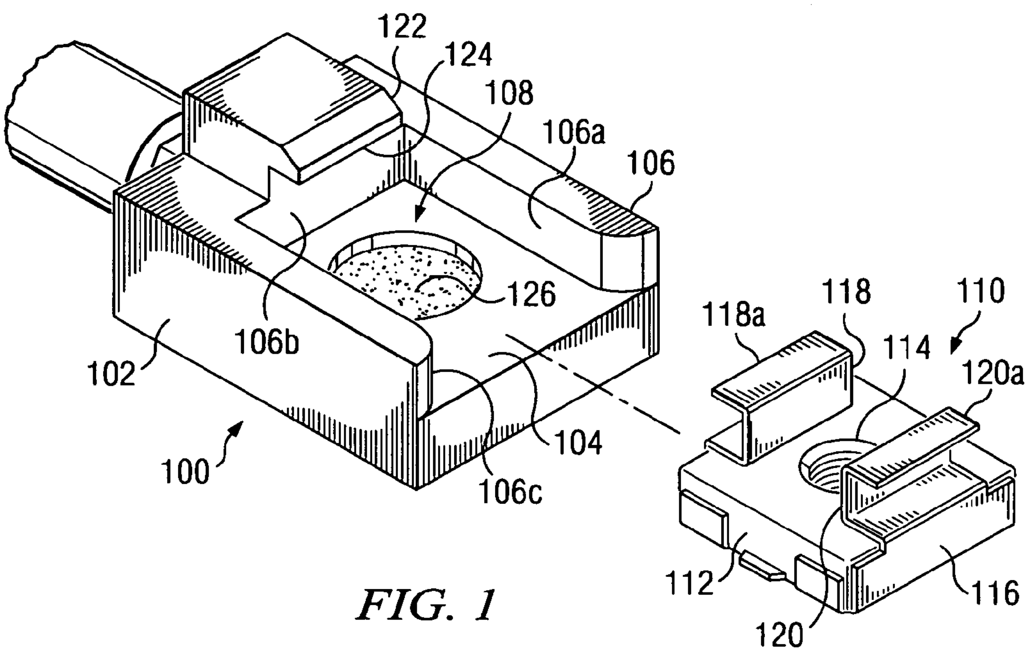
FIG. 1 is a perspective view showing an embodiment of the invention in relation to a nut-clip component that is usable therewith.

Referring to FIG. 1, there is shown a nut-clip installation tool 100, comprising an embodiment of the invention. Tool 100 includes a holder 102 having a planar seating surface 104 that is substantially enclosed by structure 106. More particularly, structure 106 comprises wall members 106*a-c* that collectively surround seating surface 104 on three sides. Thus, surface 104 and structure 106 together form a compartment or recess 108 that is open only along one side of surface 104.

Referring further to FIG. 1, there is shown a conventional nut-clip 110. Nut-clip 110 includes a nut 112 having a circular hole 114 formed through it, with threads formed around the hole. The hole diameter and the dimensions of the threads are respectively selected to enable nut 112 to engage a corresponding bolt or other threaded shaft.

Nut-clip 110 is further provided with a frame 116, made of thin metal, that is selectively formed and tightly clamped around nut 112. The frame includes hook flange members 118 and 120 that are provided with hook segments 118*a* and 120*a*, respectively. Flanges 118 and 120 extend above nut 112 and are securely joined to opposing sides of the nut, in spaced apart relationship with one another. The type and thickness of the metal that is used for flanges 118 and 120 is selected so that the flanges will be somewhat resilient, as described hereinafter.

The recess 108 of holder 102 is sized in relation to nut-clip 110. More particularly, recess 108 is sized to allow the nut-clip to be manually placed into recess 108, in loose fitting relationship with wall members 106*a-c*, and to be easily slid into and out of the recess over planar surface 104. When the nut-clip 110 is placed into recess 108, a permanent magnet embedded in holder 102, just below surface 104, applies a magnetic force to the nut-clip 110. The nut-clip is thereby retained in recess 108, as holder 102 is moved or manipulated. Moreover, when nut-clip 110 is placed into recess 108, the flange 118 is brought into abutting contact with the edge 124 of a blade member 122 that is rigidly joined to holder 102. This is shown, for example, in FIG. 4A, described hereinafter.

Figure 2:
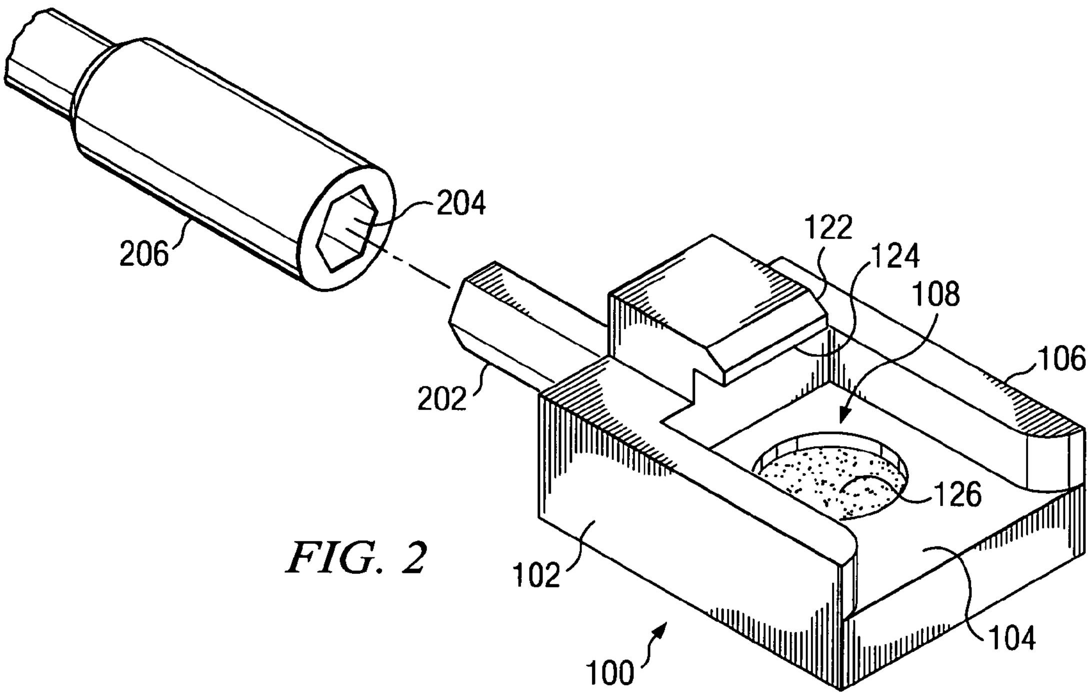
FIGS. 2 and 3 are perspective views showing the embodiment of FIG. 1 adapted for use with a conventional bit drive tool.

Referring to FIG. 2, there is shown tool 100 provided with a shank or tang 202 that extends from nut-clip holder 102 and is fixably attached thereto. Shank 202 has a hexagonal cross-section and is sized for insertion, in snug fitting relationship, into the socket 204 of a conventional socket bit driver 206. A tool of this type is commonly referred to by other names as well, such as multi-bit driver, multi-bit magnetic driver, 16-in-1, 4-in-1 and the like.

Figure 3:
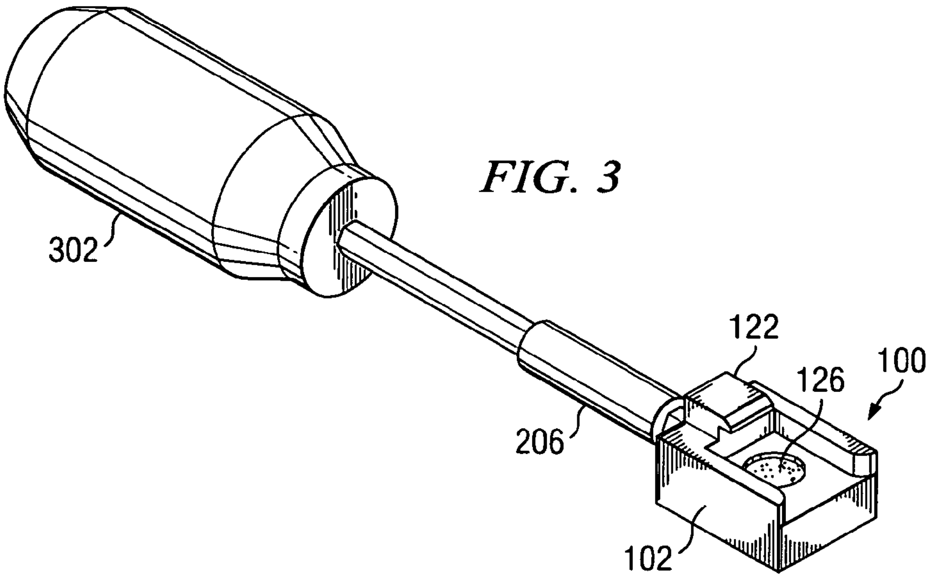

Referring to FIG. 3, there is shown driver 206 provided with a handle 302. The user of nut-clip installation tool 100 is thus enabled to grasp handle 302 with a single hand, in order to maneuver the tool, and the nut-clip contained therein, through respective steps of an installation procedure as further described herein.

Figure 4A:
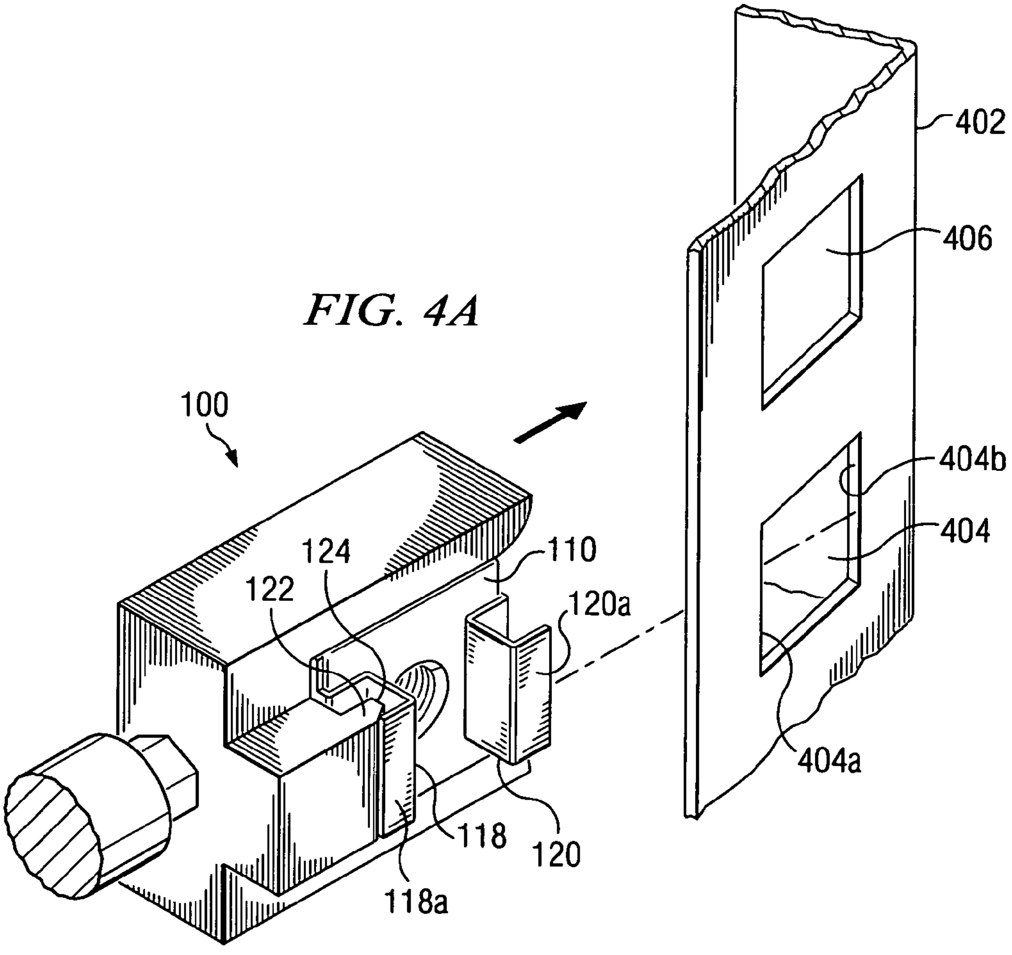
FIGS. 4A-4C are perspective views depicting respective steps in using the embodiment of FIG. 1 to attach a nut-clip to a support member.

Referring to FIG. 4A, there is shown installation tool 100 being moved to attach nut-clip 110 to structure such as a rigid vertical support member 402, only a portion of which is shown. Support member 402 is perforated with rectangular slots or cutouts, such as 404 and 406, that are located at different levels along a vertical direction. Nut-clip 110 is to be attached to support member 402 by inserting hook flanges 118 and 120 into slot 404. Nut-clip 110 will thereby be made available to provide support for an electronic or other component, at the level of slot 404.

Figure 4B:
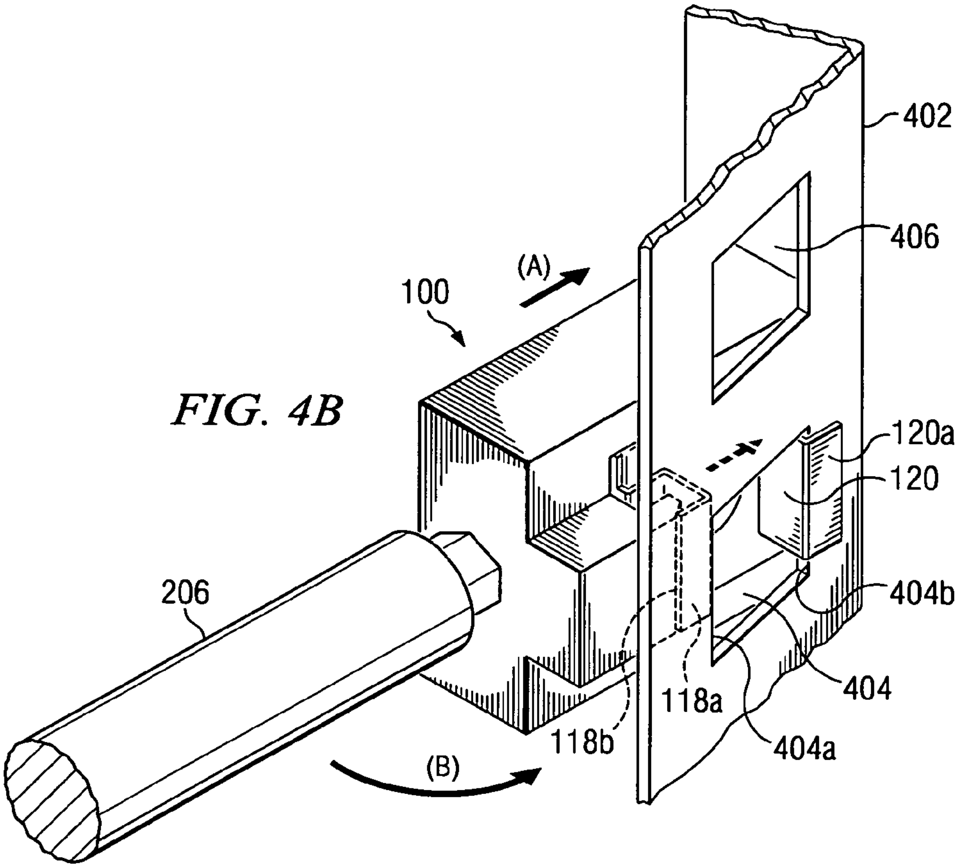

As an initial step in the nut-clip installation procedure, tool 100 is moved to place hook segment 120*a* of flange 120 on the side of member 402 that is opposite from tool 100 and the remainder of nut-clip 110. This is best shown in FIG. 4B, which also shows flange 120 in abutting contact with slot edge 404*b*. Moreover, nut-clip 110 is constructed so that when flanges 118 and 120 are both in a relaxed or unstressed condition, spacing therebetween is greater than the spacing between edges 404*a* and 404*b* of slot 404. Accordingly, FIG. 4B shows flange segment 118*a* on the same side of member 402 as the installation tool 100.

Referring further to FIG. 4B, after nut-clip 110 has been positioned as shown in FIG. 4B, installation tool 100 is urged or controllably moved in the direction indicated by arrow (A). Blade member 122 of tool 100 thereby applies a force to flange 118 that urges flange hook segment 118*a* toward edges 404*a* and 404*b* of slot 404. Since flange 120 is trapped against edge 404*b*, the spacing between flanges 118 and 120 will decrease, until edge 118*b* of hook segment 118*a* moves past slot 404*a*. As viewed in FIG. 4B, this would be movement of edge 118*b* to the right of slot edge 404*a*. When this occurs, tool 100 is pivoted in the direction shown by arrow (B). This moves the hook segment 118*a* to the same side of the member 402 as segment 120*a*, as best shown by FIG. 4C.

Figure 4C:
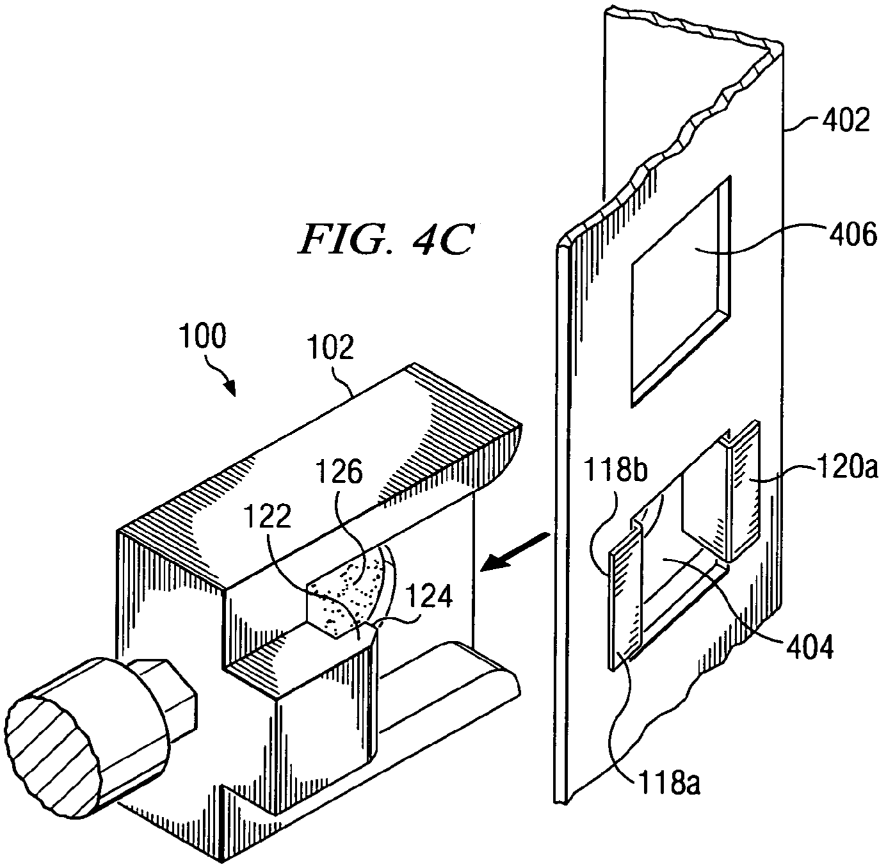

FIG. 4C further shows installation tool 100 being moved away from slot 404, while flanges 118 and 120 hold nut-clip 110 adjacent to the slot. The force of movement overcomes the holding force provided by magnet 126, so that the nut-clip slides out of holder 102. The force applied to flange 118 by the blade member 122 is thus removed, and the flanges move back to their respective unstressed positions. The flanges then act to firmly fix nut-clip 110 to support 402, adjacent to slot 404.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A tool apparatus for use in attaching a hardware component, said apparatus comprising:

a component holder having a slot defined by spaced apart edges and adapted to receive said hardware component, said component holder having first and second resilient spaced apart flange members;

a blade member extending over the slot of the holder and positioned to bear against said first flange member when said hardware component is received into said holder;

a retaining element provided adjacent the slot of said holder for releasably retaining said hardware component in said holder;

a manipulator for maneuvering said holder and retained hardware component to position said second flange member against a given one of said slot edges, and for thereafter applying a force through said blade member to reduce the spacing between said first and second flange members, in order to allow insertion of both said flange members into said slot;

a planar surface provided between said spaced apart edges to slidably receive and supportably carry said hardware component;

a wall structure positioned around said planar surface to constrain said hardware component to slide onto and off of said planar surface only through a single open end provided in said holder, said wall structure forming said spaced apart edges; and said retaining element comprises a magnet recessed within said slot of said holder to magnetically engage said hardware component when said hardware component is received upon said planar surface.

2. A tool apparatus assembly comprising:

said apparatus of claim 1;

said hardware component including a nut of specified dimensions; and said first and second flange members comprising first and second hook flanges, respectively, each hook flange having a hook segment that is spaced apart from said nut.

3. The apparatus of claim 1, wherein:

said blade member is fixably joined to said holder, adjacent to a side of said planar surface opposing said single open end, and is provided with an edge configured to bear against said first hook flange when said hardware component is received into said holder.

4. The apparatus of claim 3, wherein:

said manipulator comprises a linear member that extends from said holder, and is adapted for insertion into a socket provided in a tool having a handle.

5. The apparatus of claim 4, wherein:

said slot comprises one of a number of rectangular slots that are formed in a support member and spaced apart vertically, at regular intervals.

6. A tool apparatus assembly comprising:

said apparatus of claim 1;

said hardware component including a nut of specified dimensions; and said first and second flange members comprising first and second hook flanges, respectively, each hook flange having a hook segment that is spaced apart from said nut;

wherein said holder is adapted for movement to insert the hook segments of said first and second flange members through said slot, and to thereafter move away from said slot so that said hardware component is withdrawn from said holder, and remains attached to said wall structure.

* * * * *

UNITED STATES PATENT AND TRADEMARK OFFICE

CERTIFICATE OF CORRECTION

PATENT NO. : 7,650,677 B1
APPLICATION NO. : 11/141826
DATED : January 26, 2010
INVENTOR(S) : Rodney Burgess It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Twenty-eighth Day of December, 2010

David J. Kappos

*Director of the United States Patent and Trademark Office*